(12) United States Patent
Agnes et al.

(10) Patent No.: US 10,333,423 B2
(45) Date of Patent: *Jun. 25, 2019

(54) ELECTRONIC DEVICE WITH A MAINTAIN POWER SIGNATURE (MPS) DEVICE AND ASSOCIATED METHODS

(71) Applicant: STMicroelectronics S.r.l., Agrate Brianza (IT)

(72) Inventors: Andrea Agnes, Pavia (IT); Christian Beia, Somma Lombardo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 51 days.

This patent is subject to a terminal disclaimer.

(21) Appl. No.: 15/940,644

(22) Filed: Mar. 29, 2018

(65) Prior Publication Data

US 2018/0219490 A1     Aug. 2, 2018

Related U.S. Application Data

(63) Continuation of application No. 14/856,686, filed on Sep. 17, 2015, now Pat. No. 9,935,560.

(51) Int. Cl.
| | | |
|---|---|---|
| H02M 7/06 | (2006.01) | |
| H02M 3/07 | (2006.01) | |
| H02M 7/217 | (2006.01) | |
| G05F 3/24 | (2006.01) | |
| G06F 1/26 | (2006.01) | |
| H04L 12/10 | (2006.01) | |
| H04L 12/40 | (2006.01) | |

(52) U.S. Cl.
CPC ............... *H02M 7/06* (2013.01); *G05F 3/24* (2013.01); *G06F 1/266* (2013.01); *H02M 3/07* (2013.01); *H02M 7/217* (2013.01); *H04L 12/10* (2013.01); *H04L 12/40045* (2013.01)

(58) Field of Classification Search
None
See application file for complete search history.

(56) References Cited

U.S. PATENT DOCUMENTS

| | | |
|---|---|---|
| 7,091,770 B2 | 8/2006 | Schlaffer |
| 7,490,251 B2 | 2/2009 | Lum et al. |

(Continued)

FOREIGN PATENT DOCUMENTS

| | | |
|---|---|---|
| WO | 03091818 A1 | 11/2003 |

OTHER PUBLICATIONS

"PoE Ideal Diode Bridge Controller," Linear Technology, LT4321, www.linear.com/LT4321; retrieved from the internet Sep. 14, 2015, 12 pages.

*Primary Examiner* — Henry Lee, III
(74) *Attorney, Agent, or Firm* — Slater Matsil, LLP

(57) ABSTRACT

An electronic device includes a rectifier bridge that includes an input configured to be coupled to power over Ethernet (PoE) power sourcing equipment (PSE), and an output. A transistor is configured to selectively couple the output with a load. The electronic device includes a maintain power signature (MPS) device, and a control circuit. The control circuit is to maintain the transistor on when a load current is above a threshold, source current from the rectifier bridge to the MPS device when the load current is below the threshold, and switch the transistor to a diode configuration when the load current is below the threshold.

20 Claims, 2 Drawing Sheets

(56) References Cited

U.S. PATENT DOCUMENTS

| | | | |
|---|---|---|---|
| 8,064,179 B2 | 11/2011 | Apfel | |
| 2007/0189495 A1* | 8/2007 | Crawley | H04L 12/10 |
| | | | 379/323 |
| 2007/0263675 A1 | 11/2007 | Lum et al. | |
| 2008/0276104 A1 | 11/2008 | Hussain et al. | |
| 2011/0125341 A1 | 5/2011 | Heath et al. | |
| 2014/0084681 A1 | 3/2014 | Vigna et al. | |
| 2015/0019884 A1* | 1/2015 | Huff | H04L 12/10 |
| | | | 713/300 |
| 2015/0372826 A1* | 12/2015 | Blaut | H04L 12/10 |
| | | | 307/1 |
| 2017/0012788 A1* | 1/2017 | Rimboim | H04L 12/10 |

* cited by examiner

ELECTRONIC DEVICE WITH A MAINTAIN POWER SIGNATURE (MPS) DEVICE AND ASSOCIATED METHODS

CROSS-REFERENCE TO RELATED APPLICATIONS

This application is a continuation of U.S. patent application Ser. No. 14/856,686, filed on Sep. 17, 2015, which application is hereby incorporated herein by reference in its entirety.

TECHNICAL FIELD

The present invention relates generally to Power over Ethernet (PoE) technology, and more particularly, to an electronic device with a maintain power signature (MPS) device and related methods.

BACKGROUND

Power over Ethernet (PoE) technology is directed to passing electrical power, along with data, on Ethernet cabling. PoE technology is typically regulated by the IEEE 802.3 standard. Power is supplied in common mode over two or more of the differential pairs of wires found in the Ethernet cabling and comes from a power supply within a PoE-enabled networking device, such as an Ethernet switch, or can be injected into a cable run with a midspan power supply.

The basic elements of a PoE system include power sourcing equipment (PSE), which provides power on the Ethernet cable, and a powered device (PD) powered by the power sourcing equipment that consumes energy from the power sourcing equipment over the Ethernet cabling. Examples of powered devices include wireless access points, Internet protocol (IP) telephones, and IP cameras.

The power sourcing equipment performs a detection procedure to detect whether the powered device is a valid powered device that may be provided with power. The power sourcing equipment determines if the powered device is valid based on receiving a valid detection signal from the powered device. For example, the detection signal has a maximum resistance of 26.3 kohms and a maximum capacitance of 120 nF.

In accordance with the IEEE 802.3-2012 standard, the power sourcing equipment uses a maintain power signature (MPS) operation to determine if a powered device continues to require power after the power was provided to the powered device. The maintain power signature requires the powered device to periodically draw at least 10 mA.

One approach for a maintain power signature operation is provided by an electronic device 20 that includes a rectifier bridge 30 comprising an input 32 configured to be coupled to PoE power sourcing equipment via Ethernet cabling 34, and an output 36, as illustrated in FIG. 1. A transistor 40 selectively connects and disconnects the output 36 with a load 50. A parasitic diode 48 is associated with the transistor 40. When the transistor 40 is connected to the supply voltage (VDD) leg, a charge pump 60 is used to increase the voltage being applied to a control terminal 41 of the transistor 40.

The load 50 may be a power converter, such as a DC/DC converter, that generates a power output required by the powered device. The powered device is connectable to the power converter. The load 50 includes a load capacitance 52 as a low frequency filter. The load capacitance 52 may have a value of 100 µF, for example, and is charged to the supply voltage (VDD).

The electronic device 20 includes a maintain power signature device 70 which is configured as a current source to be connected across the rectifier bridge 30. When the load 50 periodically draws less than 10 mA, then a control circuit 80 is configured to enable the maintain power signature device 70 by generating a control signal to a maintain power signature switch 72 coupled in series with the maintain power signature device 70. With the maintain power signature device 70 enabled, the current consumption of the maintain power signature device increases the total current so as to reach 10 mA. In this configuration, the effect of a voltage droop is current sharing from the Ethernet cabling 34 via the rectifier bridge (path 1) and from the load capacitance 52 (path 2). However, more current is provided by the load capacitance 52 instead of from the power sourcing equipment because of the rectifier bridge 30.

Consequently, there is a need to cancel the current from the load capacitance 52 and provide an adequate flow of current from the power sourcing equipment over the Ethernet cabling 34.

The current IEEE 802.3-at standard allows for a maintain power signature current consumption of 10 mA for a minimum of 75 msec and for a maximum cycle of 250 msec. A voltage droop in the supply voltage (VDD) from the power sourcing equipment allows the load capacitance 52 to discharge current for a time period that reduces duration of the pulse of current for the maintain power signature.

SUMMARY

An electronic device includes a rectifier bridge comprising an input configured to be coupled to power over Ethernet (PoE) power sourcing equipment (PSE), and an output. A transistor may be configured to selectively couple the output with a load. The electronic device may include a maintain power signature (MPS) device. A control circuit may be configured to maintain the transistor on when a load current is above a threshold, source current from the rectifier bridge to the MPS device when the load current is below the threshold, and switch the transistor to a diode configuration when the load current is below the threshold. To place the transistor in a diode configuration, a short is placed between a control terminal (e.g., gate) and a conduction terminal (e.g., drain) of the transistor).

The load may include a load capacitance connected in parallel to the load. The load capacitance may be charged to a supply voltage (VDD) as provided by the power sourcing equipment. When the control circuit switches the transistor to the diode configuration, a voltage droop in the supply voltage prevents current flowing from the load capacitance while providing an adequate flow of current from the power sourcing equipment over the Ethernet cabling.

The control circuit may generate a control signal when the load current is below the threshold. The transistor may comprise a first conduction terminal, a second conduction terminal, and a control terminal. The electronic device may further comprise a switch coupled between the first conduction terminal and the control terminal to switch the transistor to the diode configuration based on the control signal. The transistor may comprises a MOSFET, with the first conduction terminal defining a drain, the second conduction terminal defining a source, and the control terminal defining a gate.

The control circuit may generate a control signal when the load current is below the threshold. The electronic device may further comprise an MPS switch coupled in series with the MPS device based on the control signal so that the MPS device is coupled across the rectifier bridge. The MPS device may comprise a pulsed current source. The period and duty cycle of which may be in accordance with the relevant standard.

The electronic device may further comprise a second transistor coupled in series with the transistor between the rectifier bridge and the output. The control circuit may be further configured to maintain the second transistor on when the load current is above the threshold. The transistor may comprise a first conduction terminal coupled to the rectifier bridge, a second conduction terminal, and a control terminal. The second transistor may comprise a first conduction terminal coupled to the output, a second conduction terminal coupled to the second conduction terminal of the transistor, and a control terminal coupled to the control terminal of the transistor.

The electronic device may further comprise a charge pump circuit coupled between the rectifier bridge and the transistor. The load may comprise a power converter connectable to a powered device that is to be powered by the PSE. The power converter may comprise a DC/DC converter, for example.

Another aspect is directed to an electronic device comprising a rectifier bridge comprising an input configured to be coupled to power over Ethernet (PoE) power sourcing equipment (PSE), and an output. A transistor may be configured to selectively couple the output with a load, with the transistor comprising a first conduction terminal, a second conduction terminal, and a control terminal. The electronic device may include a maintain power signature (MPS) device, and an MPS switch coupled in series with the MPS device. A switch may be selectively coupled to the first conduction terminal and the control terminal of the transistor. A control circuit may be configured to maintain the transistor on when a load current is above a threshold, operate the MPS switch so as to source current from the rectifier bridge to the MPS device when the load current is below the threshold, and operate the switch so as to place the transistor in a diode configuration when the load current is below the threshold.

Yet another aspect is directed to a method for providing power to a load using an electronic device as described above. The method comprises coupling the input of the rectifier bridge to power over Ethernet (PoE) power sourcing equipment (PSE), and maintaining the transistor on when a load current is above a threshold. The method may further comprise sourcing current from the rectifier bridge to the MPS device when the load current is below the threshold, and switching the transistor to a diode configuration when the load current is below the threshold.

DETAILED DESCRIPTION OF ILLUSTRATIVE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
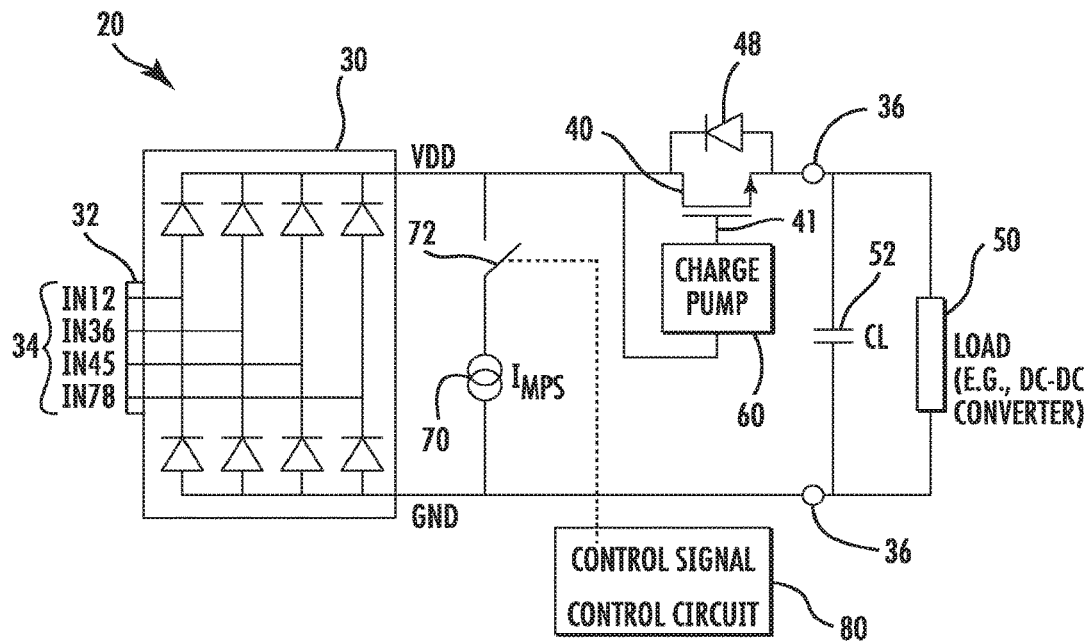
FIG. 1 is a schematic diagram of an electronic device with a maintain power signature (MPS) device in accordance with the prior art.
Figure 2:
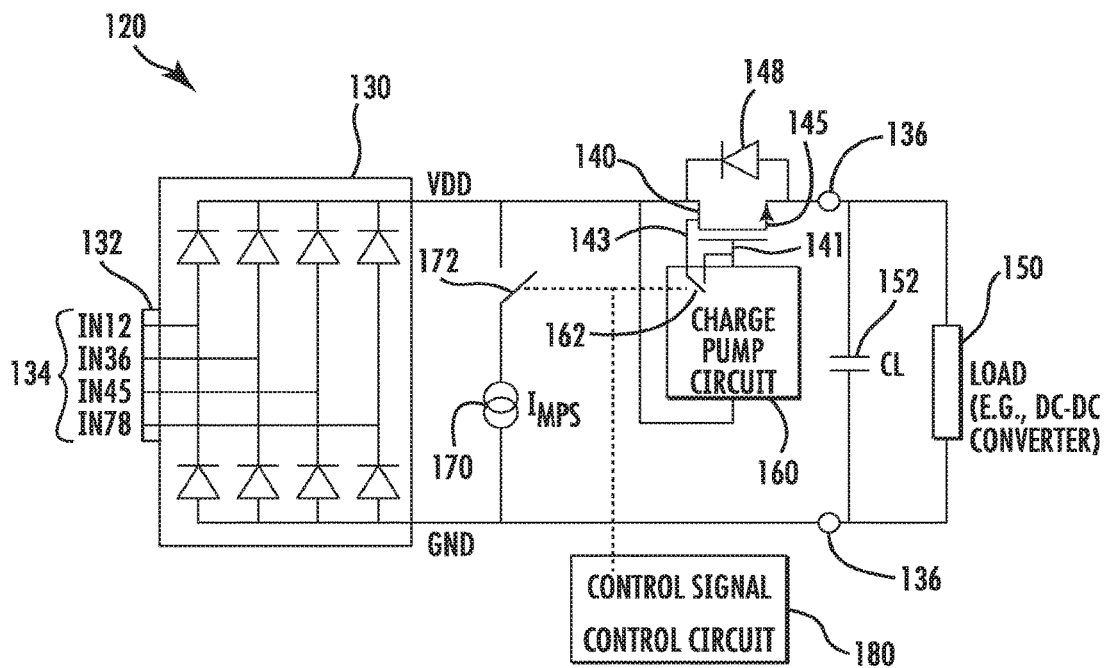
FIG. 2 is a schematic diagram of an electronic device with a maintain power signature (MPS) device in accordance with the present invention.

Referring now to FIG. 2, an electronic device 120 includes a rectifier bridge 130 comprising an input 132 configured to be coupled to power over Ethernet (PoE) power sourcing equipment (PSE), and an output 136. A transistor 140 is configured to selectively couple the output 136 with a load 150. The electronic device 120 includes a maintain power signature (MPS) device 170 and a control circuit 180. The control circuit 180 is configured to maintain the transistor 140 on when a load current is above a threshold, source current from the rectifier bridge 130 to the maintain power signature device 170 when the load current is below the threshold, and switch the transistor 140 to a diode configuration when the load current is below the threshold.

The load 150 includes a load capacitance 152 connected in parallel to the load. The load capacitance 152 functions as a low frequency filter and is charged to a supply voltage (VDD) as provided by the power sourcing equipment.

When the control circuit 180 switches the transistor 140 to the diode configuration, this reduces voltage across the load capacitance 152 while providing an adequate flow of current from the power sourcing equipment over the Ethernet cabling. This configuration blocks an inverse current from the load capacitance 152 to the maintain power signature device 170 as long as the voltage droop in the supply voltage from the power sourcing equipment since is lower than $Vth_{transistor}$. In other words, the effect of a voltage droop up to $Vth_{transistor}$ in the supply voltage is negligible current from the load capacitance 152 to the maintain power signature device 170 when the transistor 140 is in a diode configuration.

The load 150 may be a power converter connectable to a powered device that is to be powered by the power sourcing equipment. The power converter may be a DC/DC converter, for example. Examples of powered devices include wireless access points, Internet protocol (IP) telephones, and IP cameras.

The transistor 140 may be on the power supply (VDD) leg, as illustrated. Alternatively, the transistor 140 may be placed on the low side leg, such as ground, for example. The transistor 140 is an n-channel MOSFET with a drain 143 connected to the rectifier bridge 130, and a source 145 connected to the output 136. A parasitic diode 148 is associated with the transistor 140.

Since the transistor 140 is on the power supply (VDD) leg, a charge pump circuit 160 is coupled between the power supply leg and a gate 141 of the transistor 140. The charge pump circuit 160 increases the voltage applied to the gate 141 of the transistor 140. For example, the charge pump circuit 160 increases the power supply voltage (VDD) by lo volts, i.e., VDD+10 volts.

As readily appreciated by those skilled in the art, the power sourcing equipment uses a maintain power signature operation to determine if the powered device continues to require power after the power was provided to the powered device. Consequently, the load current needs to be above the threshold. The threshold is 10 mA based on the IEEE 802.3 standard. Nonetheless, the illustrated electronic device 120 is not limited to this threshold in other applications.

When the transistor 140 is on and the load 150 requires a load current greater than 10 mA, then no additional maintain power signature current is needed for keeping power from the power sourcing equipment. However, if the transistor 140 is on and the load 150 has a load current that is less than 10 mA, then the maintain power signature device 170 is enabled by the control circuit 180. The current consumption of the maintain power signature device 180 increases the total current required by the load 150 to the power sourcing equipment with the purpose of reaching 10 mA. This is a required minimal current for keeping the power on.

The maintain power signature device 180 is configured as a pulsed current source and is in series with a maintain power signature switch 172. The maintain power signature switch 172 is selectively enabled by the control circuit to connect the maintain power signature device 180 across the rectifier bridge 130. The control circuit 180 generates a control signal that is applied to the maintain power signature switch 172.

At the same time, the control signal is also used to provide a direct connection between the gate 141 and the drain 143 of the transistor. For illustration purposes, the control signal is applied to the charge pump circuit 160 which provides the direct connection. The charge pump circuit 160 is configured to include a switch 162 that is connected across that gate 141 and the drain 143 based on the control signal. Alternatively, the switch 162 may be external the charge pump circuit 160. With the transistor 140 configured as a diode, the output voltage (VOUT) can reach a maximum voltage of VDD−$Vth_{transistor}$.

Figure 3:
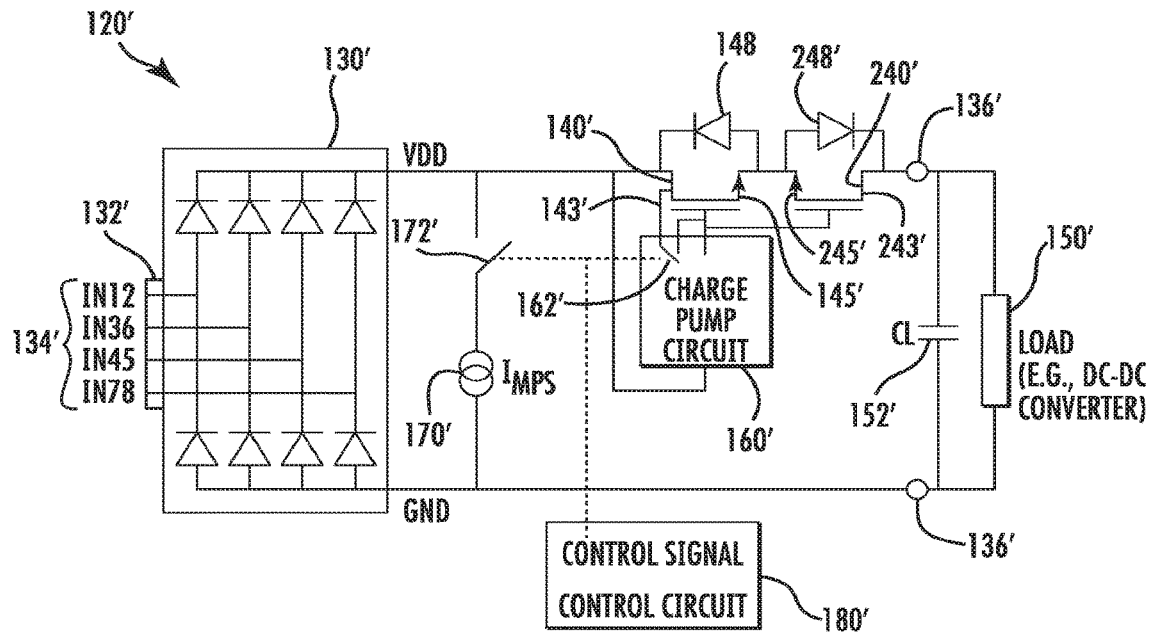
FIG. 3 is a schematic diagram of another embodiment of the electronic device illustrated in FIG. 2 with two transistors coupled in series.

Referring now to FIG. 3, another embodiment of the electronic device 120' includes two transistors 140', 240' connected in series. The second transistor 240' allows an inverse current to be blocked when the voltage droop in the supply voltage is greater than $Vth_{transistor}$. In particular, the second transistor 240' can block the inverse current also if the output voltage (VOUT) is kept greater than VDD by an auxiliary supply voltage applied to VOUT. In the latter case the control circuit 180' is configured to maintain the second transistor 240' on when the current which flows through the transistor is above the threshold.

The second transistor 240' is also an n-channel MOSFET with a drain 243', a source 245', and a gate 241'. A parasitic diode 248' is associated with the second transistor 240'. The source 245' of the second transistor 240' is coupled to the source 145' of the first transistor 140', and the drain 243' of the second transistor 240' is coupled to the output 136'. The gates 141', 241' of the first and second transistors 140', 240' are both coupled together and to the charge pump circuit 160'.

Figure 4:
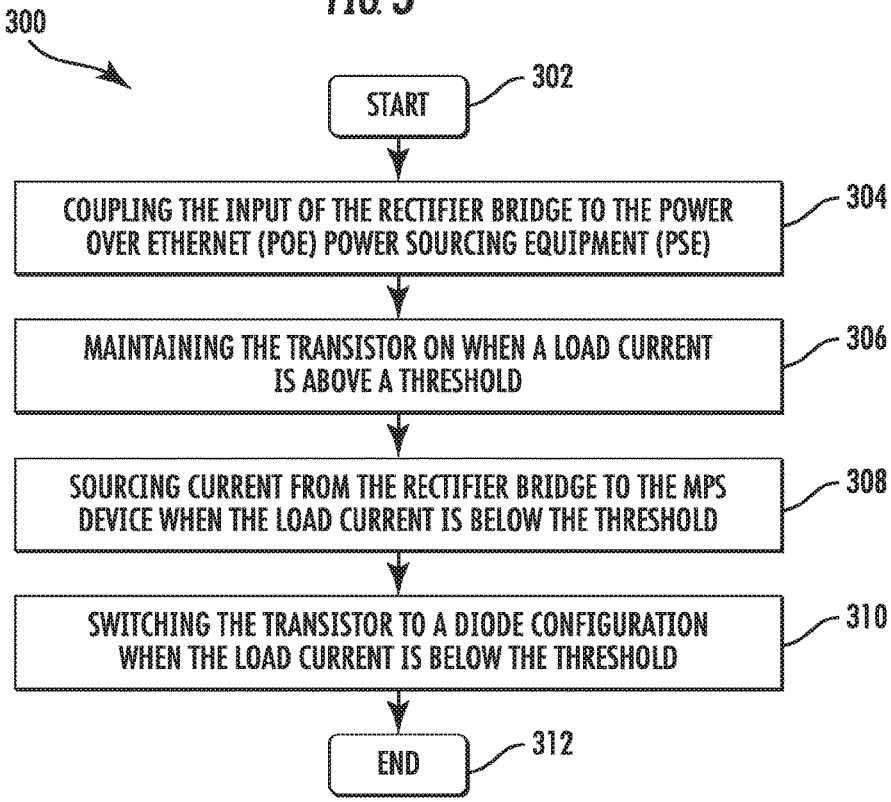
FIG. 4 is a flowchart illustrating a method for providing power to a load using the electronic device illustrated in FIG. 2.

Referring now to the flowchart 300 illustrated in FIG. 4, a method for providing power to a load 150 using the above described electronic device 120 will be discussed. From the start (Block 302), the method comprises coupling the input 132 of the rectifier bridge 130 to the power over Ethernet (PoE) power sourcing equipment (PSE) at Block 304. The transistor 140 is maintained on at Block 306 when a load current is above a threshold. The method further comprises sourcing current from the rectifier bridge 130 to the MPS device 170 when the load current is below the threshold at Block 308, and switching the transistor 140 to a diode configuration when the load current is below the threshold at Block 310. The method ends at Block 312.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A device comprising:
   an input terminal configured to be coupled to a rectifier bridge;
   an output terminal configured to be coupled to a load;
   a transistor having a current path coupled between the input terminal and the output terminal;
   a maintain power signature (MPS) device coupled to the input terminal;
   a first switch coupled in series with the MPS device;
   a second switch coupled between the input terminal and a control terminal of the transistor; and
   a control circuit configured to:
      maintain the transistor on when a load current flowing through the load is above a threshold, and
      switch the transistor to a diode configuration by applying a control signal to the second switch when the load current is below the threshold.

2. The device of claim 1, further comprising the rectifier bridge coupled to the input terminal.

3. The device of claim 2, wherein the rectifier bridge comprises an input configured to be coupled to a power over Ethernet power sourcing equipment.

4. The device of claim 1, wherein the control circuit is configured to switch the transistor to the diode configuration by turning on the second switch with the control signal.

5. The device of claim 1, further comprising a charge pump circuit coupled to the control terminal of the transistor.

6. The device of claim 5, wherein the second switch is part of the charge pump circuit.

7. The device of claim 5, wherein the charge pump circuit is configured to generate a voltage higher than a voltage of the input terminal.

8. The device of claim 1, further comprising the load coupled to the output terminal, wherein the load is a DC/DC converter.

9. The device of claim 1, wherein the input terminal is configured to be coupled to a cathode of a diode of the rectifier bridge.

10. The device of claim 1, wherein the first switch is directly connected to the current path of the transistor.

11. The device of claim 1, wherein the transistor is an n-channel metal-oxide-semiconductor field-effect transistor (MOSFET).

12. The device of claim 11, further comprising a second transistor having a current path coupled in series with the current path of the transistor, wherein a source of the transistor is coupled to a source of the second transistor and wherein the second transistor is an n-channel MOSFET.

13. The device of claim 12, wherein a control terminal of the second transistor is coupled to the control terminal of the transistor.

14. The device of claim 1, wherein the MPS device comprises a current source coupled in series with the first switch.

15. A device comprising:
an input terminal configured to be coupled to a rectifier bridge;
an output terminal configured to be coupled to a load;
a transistor having a current path coupled between the input terminal and the output terminal;
a maintain power signature (MPS) device coupled to the input terminal;
a first switch coupled in series with the MPS device;
a second switch coupled between the input terminal and a control terminal of the transistor; and
a control circuit configured to:
maintain the transistor on when a load current flowing through the load is above a threshold, and
when the load current is below the threshold, use the MPS device to source current from the rectifier bridge by switching the transistor to a diode configuration by applying a control signal to the second switch.

16. The device of claim 15, further comprising a second transistor having a current path coupled in series with the current path of the transistor, wherein the transistor is an n-channel metal-oxide-semiconductor field-effect transistor (MOSFET), wherein the second transistor is an n-channel MOSFET, and wherein a source of the transistor is coupled to a source of the second transistor.

17. The device of claim 15, wherein the MPS device is configured to be coupled across the rectifier bridge.

18. A method of operating a circuit that comprises a load coupled to a rectifier bridge via a transistor, the method comprising:
when a load current flowing through the load is above a threshold, using a charge pump circuit to maintain the transistor in a conductive state; and
when the load current is below the threshold, sourcing current from the rectifier bridge using a maintain power signature (MPS) device by controlling a first switch coupled to the MPS device, and switching the transistor to a diode configuration by controlling a second switch coupled between a current path of the transistor and a control terminal of the transistor.

19. The method of claim 18, wherein the threshold is 10 mA.

20. The method of claim 18, wherein maintaining the transistor on comprises generating a voltage with the charge pump circuit that is 10 V higher than a voltage at an output of the rectifier bridge.

* * * * *